United States Patent
Kalaga et al.

(10) Patent No.: US 10,577,553 B2
(45) Date of Patent: Mar. 3, 2020

(54) WATER BASED PRODUCT FOR TREATING VANADIUM RICH OILS

(71) Applicant: General Electric Company, Schenectady, NY (US)

(72) Inventors: Murali Krishna Kalaga, Bangalore (IN); Donald Meskers, Jr., Trevose, PA (US); Sundar Amancherla, Dammam (SA)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 15/672,935

(22) Filed: Aug. 9, 2017

(65) Prior Publication Data

US 2019/0048279 A1   Feb. 14, 2019

(51) Int. Cl.

| | | |
|---|---|---|
| *C10L 10/04* | (2006.01) | |
| *C10L 9/10* | (2006.01) | |
| *C10L 1/10* | (2006.01) | |
| *C10L 1/04* | (2006.01) | |
| *C10L 10/18* | (2006.01) | |
| *F02C 7/30* | (2006.01) | |
| *F23J 7/00* | (2006.01) | |
| *C10L 1/198* | (2006.01) | |
| *C10L 1/12* | (2006.01) | |
| *C10L 1/232* | (2006.01) | |
| *C10L 1/188* | (2006.01) | |
| *C10L 1/222* | (2006.01) | |
| *C10L 1/24* | (2006.01) | |

(52) U.S. Cl.
CPC .............. *C10L 10/04* (2013.01); *C10L 1/04* (2013.01); *C10L 1/10* (2013.01); *C10L 9/10* (2013.01); *C10L 10/18* (2013.01); *F02C 7/30* (2013.01); *F23J 7/00* (2013.01); *C10L 1/125* (2013.01); *C10L 1/1216* (2013.01); *C10L 1/1291* (2013.01); *C10L 1/1881* (2013.01); *C10L 1/1883* (2013.01); *C10L 1/1981* (2013.01); *C10L 1/1985* (2013.01); *C10L 1/2222* (2013.01); *C10L 1/232* (2013.01); *C10L 1/2437* (2013.01); *C10L 2230/085* (2013.01)

(58) Field of Classification Search
CPC ....................................................... C10L 10/04
USPC .......................................................... 431/4
See application file for complete search history.

(56) References Cited

U.S. PATENT DOCUMENTS

| | | | |
|---|---|---|---|
| 2,913,319 A | 11/1959 | Trautman | |
| 3,002,826 A | 10/1961 | Norris | |
| 3,057,151 A | 10/1962 | Rocchini et al. | |
| 3,865,737 A | 2/1975 | Kemp | |
| 5,421,993 A | 6/1995 | Hille et al. | |
| 5,637,118 A * | 6/1997 | Bornstein | C10L 1/1225 44/364 |
| RE36,117 E | 3/1999 | Bornstein et al. | |
| 6,632,257 B1 * | 10/2003 | Feitelberg | C10L 1/10 44/370 |
| 6,663,680 B1 * | 12/2003 | Dodd | C10L 1/328 44/301 |
| 7,766,983 B2 | 8/2010 | Schaeffer et al. | |
| 2003/0159338 A1 * | 8/2003 | Moliere | C10L 1/10 44/357 |
| 2006/0059768 A1 | 3/2006 | Wallenbeck et al. | |
| 2008/0308465 A1 * | 12/2008 | Osaheni | C10G 25/05 208/253 |
| 2012/0015853 A1 | 1/2012 | Ma et al. | |
| 2014/0315136 A1 * | 10/2014 | Moliere | C10L 10/04 431/4 |
| 2015/0083165 A1 * | 3/2015 | Moliere | F01D 25/002 134/22.14 |
| 2015/0159558 A1 * | 6/2015 | Scipio | F02C 7/30 60/783 |
| 2017/0107433 A1 * | 4/2017 | Choi | C10G 55/02 |
| 2017/0158978 A1 * | 6/2017 | Montagne | F01D 5/286 |
| 2017/0191423 A1 * | 7/2017 | Scipio | F02C 3/04 |
| 2017/0198204 A1 | 7/2017 | Nguyen et al. | |
| 2017/0253821 A1 * | 9/2017 | Montagne | C10L 10/04 |
| 2017/0298284 A1 * | 10/2017 | Choi | F02C 3/30 |

FOREIGN PATENT DOCUMENTS

| | | |
|---|---|---|
| AU | 477723 B | 11/1974 |
| GB | 964 184 A | 7/1964 |
| GB | 1061161 A | 3/1967 |
| GB | 1459032 A | 12/1976 |
| JP | 03011326 B2 | 2/2000 |

OTHER PUBLICATIONS

Extended European Search Report and Opinion issued in connection with corresponding EP Application No. 18187791.1 dated Nov. 26, 2018.

* cited by examiner

*Primary Examiner* — Ellen M Mcavoy

(74) *Attorney, Agent, or Firm* — Eversheds Sutherland (US) LLP

(57) ABSTRACT

Provided are water-based fuel additive compositions that, when combusted with a fuel containing vanadium in a gas turbine, inhibit vanadium hot corrosion in the gas turbine. The water-based fuel additive compositions include at least one rare earth element compound or alkaline earth element compound that retards vanadium corrosion resulting from combustion of vanadium rich fuel.

18 Claims, No Drawings

WATER BASED PRODUCT FOR TREATING VANADIUM RICH OILS

FIELD OF THE INVENTION

The present invention is directed to methods and compositions for protecting articles, such as turbine components, using inhibitors to react with undesirable fuel contaminants.

BACKGROUND

Power generation systems such as gas turbines can operate on a wide variety of gaseous and liquid fuels. Modern high-efficiency combustion turbines combust fuels at temperatures that can exceed 2000° F. (1093° C.) and nominal firing temperatures continue to increase as demand for more efficient engines continues. The process of choosing a fuel is a complex task that is influenced by multiple factors including fuel price and availability, as well as government policy and regulation.

Opportunity crude oils, such as metal rich crude oils, provide a low cost liquid fuel option for power generation. However, operating a gas turbine with opportunity crude oils, or heavy fuel oil (HFO) obtained therefrom, can pose operational challenges. Opportunity crude oils may contain a variety of metal impurities that need to be treated prior to their combustion in order to attenuate the high temperature corrosion, erosion, and fouling effects of these metals on a gas turbine, which in turn may lead to turbine degradation and operability/reliability issues. One such impurity is vanadium.

In the gas turbine, combustion of vanadium containing fuels can create ash deposits comprising vanadium pentoxide ($V_2O_5$), which has a low melting point of about 1247° F. (675° C.). In the presence of low levels of sodium, $V_2O_5$ can form a series of low melting sodium vanadates such as $Na_2O$—$V_2O_5$ which has melting temperatures of 1165° F. (629° C.). At typical gas turbine operating temperatures, these vanadic ash deposits are molten (e.g. liquid) and contribute to accelerated hot gas path hardware corrosion.

Vanadium is typically present as part of the heavy, oil soluble fuel component of crude oil. Vanadium derivatives in crude oil are organic in nature, and therefore cannot be removed with a water wash since they are not water soluble. Chemical additives have been added to fuel to inhibit vanadium corrosion, the most prevalent additives being magnesium containing additives. Magnesium modifies the ash composition by reacting with vanadium to form an inert magnesium vanadate compound, magnesium orthovanadate, which has an increased ash melting point of about 1965° F. (1074° C.). Vanadic corrosion is controlled because the combustion ash does not melt and remains in a solid state.

While magnesium has proved useful as a vanadic corrosion inhibitor, it suffers from many limitations. Combustion turbines cannot operate at firing temperatures above 2000° F. (1093° C.) when using magnesium additives to inhibit vanadic corrosion because magnesium orthovanadate has a limiting melting point. Additionally, the combustion ash deposits on gas turbine blades and vanes, leading to equipment degradation over time. Furthermore, in order to ensure complete reaction with vanadium, magnesium is fed in excess. This excess magnesium can sinter at high temperature and forms periclase within the deposit which is hard and not removable via periodic water washing of the hot gas path.

SUMMARY OF THE INVENTION

Provided are compositions and methods for dealing with fuel impurities in gas turbine systems. In some aspects, the compositions and methods include chemical additives comprising a rare earth element compound and/or an alkaline earth element compound to capture vanadium present in fuel without detrimental effects to other fuel components. In some aspects, the compositions and methods utilize a combination of inhibitor chemistries that form friable combustion reaction products with high melting temperatures (e.g. >4000° F./2204° C.) and further control corrosion and fouling tendencies within the fuel handling system. The melting temperatures of the friable combustion reaction products are considerably higher than firing temperatures used in current gas turbines, and therefore do not limit firing temperatures during gas turbine operation. Thus, firing temperatures can be significantly increased as result of the chemical inhibitor robustness.

DETAILED DESCRIPTION

Certain embodiments are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Reference throughout this specification to "one embodiment," "an embodiment," or "embodiments" means that a particular feature, structure, or characteristic described in connection with the embodiment is included in at least one embodiment. Thus, the appearances of the phrases "in one embodiment" or "in an embodiment" in various places in the specification are not necessarily all referring to the same embodiment. Furthermore, the particular features, aspects, structures, or characteristics may be combined in any suitable manner in one or more embodiments.

Unless indicated otherwise, when a range of any type is disclosed or claimed, for example a range of the sizes, number, percentages, and the like, it is intended to disclose or claim individually each possible number that such a range could reasonably encompass, including any sub-ranges or combinations of sub-ranges encompassed therein. For example, when describing a range of percentages such as from 5% to 15%, it is understood that this disclosure is intended to encompass each of 5%, 6%, 7%, 8%, 9%, 10%, 11%, 12%, 13%, 14%, and 15%, as well as any ranges, sub-ranges, and combinations of sub-ranges encompassed therein.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means ±10% of the stated value.

Embodiments of the present invention concern the inhibition of high temperature corrosion of materials of thermal equipment such as boilers, diesel engines, gas turbines, furnaces and process reactors, which, in their furnace, burn vanadium-contaminated fuels. In particular, heavy or residual fuels and crude oils, which are designated with the generic term "fuels," generally may contain traces of metallic contaminants such as vanadium that need to be treated prior to their combustion in order to attenuate the high temperature corrosion effects of these metals. The fuels may also contain other undesirable impurities such as asphaltenes that may result in fouling within the fuel handling system. In what follows, gas turbines or turbines, which generally include: (i) a compressor; (ii) a furnace, which itself includes of a set of combustion chambers and (iii) a turboexpander, will be taken as paradigms of thermal equipment, although all the considerations contained in this document apply to thermal equipment in general. The flame temperature of a gas turbine, which largely determines its efficiency, is the temperature that prevails at the inlet of the turboexpander and not that which is present in the flames.

Provided are exemplary processes and compositions for dealing with fuel impurities in gas turbine systems. Embodiments of the present disclosure may, in comparison to compositions and methods not utilizing one or more features disclosed herein, provide a higher melting point vanadium reaction product; provide ash products that are highly refractory, that do not tend to stick on the hot gas path, that are not fully sintered, and that are more easily mechanically washable; inhibit corrosion caused by fuel impurities including vanadium; allow for longer time intervals between water wash cycles; allow higher gas turbine firing temperatures; or combinations thereof.

Provided are water-based fuel additive compositions for use with a vanadium-containing ash bearing fuel. The water-based fuel additive compositions may operate to prevent the formation of corrosive vanadium ash in a gas turbine combusting vanadium-containing fuel. The water-based additives may be introduced into the system via injection into the fuel directly following the fuel washing process, following the fuel storage tank, just prior to burners/nozzles, or any point in between. The composition may also be direct sprayed into the combustion zone.

In embodiments, the water-based fuel additive compositions may include one or more of the following components: a water based carrier; a first inhibitor that retards vanadium corrosion resulting from combustion of a vanadium-containing fuel in a combustion apparatus dispersed in the water based carrier, the first inhibitor comprising a rare earth element compound, an alkaline earth element compound, or a combination thereof; a second inhibitor that retards vanadium corrosion resulting from combustion of a vanadium-containing fuel in a combustion apparatus dispersed in the water based carrier, the second inhibitor comprising a rare earth element compound, an alkaline earth element compound, or a combination thereof; a third inhibitor dispersed in the water based carrier that retards combustion-related contaminant corrosion in the combustion apparatus, wherein the third inhibitor comprises a non-vanadium first row transition metal or main group metal compound; a fourth inhibitor dispersed in the water based carrier that retards non-combustion related corrosion; an emulsifier dispersed in the water based carrier; an asphaltene dispersant dispersed in the water based carrier; a combustion additive dispersed in the water based carrier that improves combustion of the fuel; and/or a pH control agent dispersed in the water based carrier.

The water-based fuel additive compositions can include a water based carrier. The water based carrier can carry one or more components of the water-based fuel additive composition, such as a first inhibitor, a second inhibitor, a third inhibitor, a fourth inhibitor, an emulsifier, an asphaltene dispersant, a combustion additive, and/or a pH control agent. That is, a first inhibitor, a second inhibitor, a third inhibitor, a fourth inhibitor, an emulsifier, an asphaltene dispersant, a combustion additive, and/or a pH control agent can be dissolved and dispersed in a water based carrier.

Generally, the water based carrier can be present in the water-based fuel additive composition from about 25 wt % to about 75 wt %, or about 30 wt % to about 70 wt %, or about 35 wt % to about 65 wt %. That is, the water based carrier can be present in about 25 wt %, about 26 wt %, about 27 wt %, about 28 wt %, about 29 wt %, about 30 wt %, about 31 wt %, about 32 wt %, about 33 wt %, about 34 wt %, about 35 wt %, about 36 wt %, about 37 wt %, about 38 wt %, about 39 wt %, about 40 wt %, about 41 wt %, about 42 wt %, about 43 wt %, about 44 wt %, about 45 wt %, about 46 wt %, about 47 wt %, about 48 wt %, about 49 wt %, about 50 wt %, about 51 wt %, about 52 wt %, about 53 wt %, about 54 wt %, about 55 wt %, about 56 wt %, about 57 wt %, about 58 wt %, about 59 wt %, about 60 wt %, about 61 wt %, about 62 wt %, about 63 wt %, about 64 wt %, about 65 wt %, about 66 wt %, about 67 wt %, about 68 wt %, about 69 wt %, about 70 wt %, about 71 wt %, about 72 wt %, about 73 wt %, about 74 wt %, or about 75 wt %. Concentrations greater than 75 wt % are also useful. Any ranges or combinations of subranges between any of these concentrations are encompassed by this disclosure.

The water-based fuel additive compositions can include one or more first inhibitors. The first inhibitors may react with vanadium present in fuel during combustion to form vanadium complexes having a higher melting temperature, thereby reducing vanadium corrosion. Suitable first inhibitors can include a compound of yttrium, lanthanum, cerium, gadolinium, magnesium, calcium, strontium, or any combination thereof. In embodiments, the first inhibitor compound is a common aqueous salt selected from a nitrate, a chloride, a sulphate, a nitrite, a hydroxide, an oxide, or any combination thereof. In embodiments, the first inhibitor compound is a hexanoate compound, an octanoate compound, an ethoxylate compound, a sulphonic acid, a sulfonate compound, a carboxylic acid, a carboxylate compound, a tolyl fatty acid compound, an organic functionalized nanoparticle metal oxide, or any combination thereof.

Generally, the one or more first inhibitors can be present in the water-based fuel additive composition from about 5 wt % to about 35 wt %, or about 8 wt % to about 32 wt %, or about 10 wt % to about 30 wt %. That is, the first inhibitors can be present in about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, or about 35 wt %. Any ranges or combinations of subranges between any of these concentrations are encompassed by this disclosure.

In embodiments, the first inhibitor comprises a compound of yttrium. In embodiments, the yttrium compound is in an inorganic salt or an yttrium oxide. In embodiments, the yttrium compound is yttrium oxide ($Y_2O_3$) or an yttrium inorganic salt selected from yttrium (III) chloride ($YCl_3$), yttrium (III) fluoride ($YF_3$), yttrium (III) iodide ($YI_3$), yttrium (III) bromide ($YBr_3$), yttrium (III) nitrate tetrahydrate ($Y(NO_3)_3 \cdot 4H_2O$), yttrium (III) nitrate hexahydrate ($Y(NO_3)_3 \cdot 6H_2O$), yttrium (III) phosphate ($YPO_4$), yttrium (III) sulfate octahydrate ($Y_2(SO_4)_2 \cdot 8H_2O$), or any combination thereof.

In embodiments, a yttrium compound can react with vanadium in fuel to form a yttrium-vanadium reaction product, $YVO_4$ or yttrium orthovanadate, which has a high melting point of 3290° F. (1810° C.). The melting point of yttrium orthovanadate is much higher than the melting point of magnesium orthovanadate, which has a melting point of about 1965° F. (1074° C.). This allows for ash products that are not fully sintered, making them more easily washable through mechanical means. The yttrium ash products are also highly refractory and do not tend to stick on the hot gas path.

The water-based fuel additive compositions may include one or more second inhibitors. The second inhibitors may react with vanadium present in fuel during combustion to form vanadium complexes having a higher melting temperature, thereby reducing vanadium corrosion. Suitable second inhibitors can include a compound of yttrium, lanthanum, cerium, gadolinium, magnesium, calcium, strontium, or any combination thereof. In embodiments, the second inhibitor compound is a hexanoate compound, an octanoate compound, an ethoxylate compound, a sulphonic acid, a sulfonate compound, a carboxylic acid, a carboxylate compound, a tolyl fatty acid compound, an organic functionalized nanoparticle metal oxide, or any combination thereof. In embodiments, the second inhibitor compound is a common aqueous salt selected from a nitrate, a chloride, a sulphate, a nitrite, a hydroxide, an oxide, or any combination thereof.

Generally, the one or more second inhibitors can be present in the water-based fuel additive composition from about 1 wt % to about 35 wt %, or about 3 wt % to about 32 wt %, or about 5 wt % to about 30 wt %. That is, the second inhibitors can be present in about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, about 25 wt %, about 26 wt %, about 27 wt %, about 28 wt %, about 29 wt %, about 30 wt %, about 31 wt %, about 32 wt %, about 33 wt %, about 34 wt %, or about 35 wt %. Any ranges or combinations of subranges between any of these concentrations are encompassed by this disclosure.

In embodiments, the first inhibitor comprises a rare earth element compound and the second inhibitor comprises a rare earth element compound. In embodiments, the first inhibitor comprises an alkaline earth element compound and the second inhibitor comprises an alkaline earth element compound. In embodiments, the first inhibitor comprises a rare earth element compound and the second inhibitor comprises an alkaline earth element compound. In embodiments, at least one of the first inhibitor or the second inhibitor must comprise a rare earth element compound.

The water-based fuel additive compositions may include one or more third inhibitors. The third inhibitors may operate to form more friable combustion reaction products, which may facilitate easier removal of ash deposits and allow gas turbines to operate with higher firing temperatures. The third inhibitor may retard vanadium corrosion in the combustion apparatus. Suitable third inhibitors can include a compound of iron, silicon, titanium, nickel, chromium, aluminum, zinc, or any combination thereof. In embodiments, the third inhibitor is a hexanoate compound, an octanoate compound, an ethoxylate compound, a sulphonic acid, a sulfonate compound, a carboxylic acid, a carboxylate compound, a tolyl fatty acid compound, an organic functionalized nanoparticle metal oxide, or any combination thereof. In embodiments, the third inhibitor compound is a common aqueous salt selected from a nitrate, a chloride, a sulphate, a nitrite, a hydroxide, an oxide, or any combination thereof.

Generally, the one or more third inhibitors can be present in the water-based fuel additive composition from about 1 wt % to about 20 wt %, or about 3 wt % to about 18 wt %, or about 5 wt % to about 15 wt %. That is, the third inhibitors can be present in about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt %. Any ranges or combinations of subranges between any of these concentrations are encompassed by this disclosure.

The water-based fuel additive compositions can include one or more fourth inhibitors. The fourth inhibitors may operate to retard non-combustion related corrosion and help maintain system hygiene. Suitable fourth inhibitors can include an oil-based polyamine, a fatty amine, an imidazole, a substituted imidazole, or any combination thereof.

Generally, the one or more fourth inhibitors can be present in the water-based fuel additive composition from about 0.1 wt % to about 5 wt %, or about 0.3 wt % to about 4.8 wt %, or about 0.5 wt % to about 4.5 wt %. That is, the fourth inhibitors can be present in about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3.0 wt %, about 3.1 wt %, about 3.2 wt %, about 3.3 wt %, about 3.4 wt %, about 3.5 wt %, about 3.6 wt %, about 3.7 wt %, about 3.8 wt %, about 3.9 wt %, about 4.0 wt %, about 4.1 wt %, about 4.2 wt %, about 4.3 wt %, about 4.4 wt %, about 4.5 wt %, about 4.6 wt %, about 4.7 wt %, about 4.8 wt %, about 4.9 wt %, or about 5.0 wt %. Any ranges or combinations of subranges between any of these concentrations are encompassed by this disclosure.

The water-based fuel additive compositions can include one or more emulsifiers. The emulsifiers may help enhance the interaction/miscibility of the water-based fuel additive composition with fuel, and may help maintain an emulsion, thereby helping to achieve the highest vanadium to inhibitor reactivity. The emulsifiers may help stabilize the water-based fuel additive composition and any active components dispersed in the water based carrier such as the first inhibitor, the second inhibitor, the third inhibitor, the fourth inhibitor, the asphaltene dispersant, the combustion additive and/or the pH control agent. That is, a first inhibitor, a second inhibitor, a third inhibitor, a fourth inhibitor, an emulsifier, an asphaltene dispersant, a combustion additive, and/or a pH control agent can be dissolved and dispersed in a water based carrier. In embodiments, the water-based fuel additive composition is an oil-in-water emulsion. Suitable emulsifiers can include non-ionic surfactants such as an alkyl ethoxylate and/or an alcohol ethoxylate.

Generally, the one or more emulsifiers can be present in the water-based fuel additive composition from about 0.1 wt % to about 5 wt %, or about 0.3 wt % to about 4.8 wt %, or about 0.5 wt % to about 4.5 wt %. That is, the emulsifiers can be present in about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3.0 wt %, about 3.1 wt %, about 3.2 wt %, about 3.3 wt %, about 3.4 wt %, about 3.5 wt %, about 3.6 wt %, about 3.7 wt %, about 3.8 wt %, about 3.9 wt %, about 4.0 wt %, about 4.1 wt %, about 4.2 wt %, about 4.3 wt %, about 4.4 wt %, about 4.5 wt %, about 4.6 wt %, about 4.7 wt %, about 4.8 wt %, about 4.9 wt %, or about 5.0 wt %. Any ranges or combinations of subranges between any of these concentrations are encompassed by this disclosure.

The water-based fuel additive compositions can include one or more asphaltene dispersants. The asphaltene dispersants may help maintain fuel flow characteristics in the presence of any inhibitor and avoid precipitation of asphaltene present in the fuel. Suitable asphaltene dispersants can include polymeric resin formulations comprising an alkyl phenol formaldehyde, and/or dodecylbenzenesulfonic acid.

Generally, the one or more asphaltene dispersants can be present in the water-based fuel additive composition from about 0.1 wt % to about 5 wt %, or about 0.3 wt % to about 4.8 wt %, or about 0.5 wt % to about 4.5 wt %. That is, the asphaltene dispersants can be present in about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3.0 wt %, about 3.1 wt %, about 3.2 wt %, about 3.3 wt %, about 3.4 wt %, about 3.5 wt %, about 3.6 wt %, about 3.7 wt %, about 3.8 wt %, about 3.9 wt %, about 4.0 wt %, about 4.1 wt %, about 4.2 wt %, about 4.3 wt %, about 4.4 wt %, about 4.5 wt %, about 4.6 wt %, about 4.7 wt %, about 4.8 wt %, about 4.9 wt %, or about 5.0 wt %. Any ranges or combinations of subranges between any of these concentrations are encompassed by this disclosure.

The water-based fuel additive compositions can include one or more combustion additives. The combustion additives may help smooth and complete combustion. Suitable combustion additives can include combustion catalysts such as a compound of iron, cerium, copper, manganese, magnesium, or any combination thereof.

Generally, the one or more combustion additives can be present in the water-based fuel additive composition from about 0.1 wt % to about 5 wt %, or about 0.3 wt % to about 4.8 wt %, or about 0.5 wt % to about 4.5 wt %. That is, the combustion additives can be present in about 0.1 wt %, about 0.2 wt %, about 0.3 wt %, about 0.4 wt %, about 0.5 wt %, about 0.6 wt %, about 0.7 wt %, about 0.8 wt %, about 0.9 wt %, about 1.0 wt %, about 1.1 wt %, about 1.2 wt %, about 1.3 wt %, about 1.4 wt %, about 1.5 wt %, about 1.6 wt %, about 1.7 wt %, about 1.8 wt %, about 1.9 wt %, about 2.0 wt %, about 2.1 wt %, about 2.2 wt %, about 2.3 wt %, about 2.4 wt %, about 2.5 wt %, about 2.6 wt %, about 2.7 wt %, about 2.8 wt %, about 2.9 wt %, about 3.0 wt %, about 3.1 wt %, about 3.2 wt %, about 3.3 wt %, about 3.4 wt %, about 3.5 wt %, about 3.6 wt %, about 3.7 wt %, about 3.8 wt %, about 3.9 wt %, about 4.0 wt %, about 4.1 wt %, about 4.2 wt %, about 4.3 wt %, about 4.4 wt %, about 4.5 wt %, about 4.6 wt %, about 4.7 wt %, about 4.8 wt %, about 4.9 wt %, or about 5.0 wt %. Any ranges or combinations of subranges between any of these concentrations are encompassed by this disclosure.

The water-based fuel additive compositions can include one or more pH control agents. The pH control agents may help keep the water-based fuel additive composition in a desired pH range (e.g. 4.5-8.5) and may help avoid any corrosion posed by chemistries. Suitable pH control agents can include a citric acid, an adipic acid, a sebacic acid, an acetic acid, a glycolic acid, a lactic acid, a $C_2$-$C_{12}$ monocarboxylic acid, a $C_2$-$C_{12}$ dicarboxylic acid, a $C_4$-$C_{12}$ tricarboxylic acid, a salt of any foregoing acid, or any combination thereof.

Generally, the one or more pH control agents can be present in the water-based fuel additive composition in an amount that helps keep the water-based fuel additive composition in a desired pH range. Desired pH ranges for water-based fuel additive compositions can include about 4.5-8.5, about 5.5-7.5, or about 5.5-6.5. That is, the pH control agents can be present in the water-based fuel additive composition in an amount that helps keep the water-based fuel additive composition at a pH of about 4.5, about 4.6, about 4.7, about 4.8, about 4.9, about 5.0, about 5.1, about 5.2, about 5.3, about 5.4, about 5.5, about 5.6, about 5.7, about 5.8, about 5.9, about 6.0, about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, about 8.1, about 8.2, about 8.3, about 8.4, or about 8.5. Any ranges or combinations of subranges between any of these concentrations are encompassed by this disclosure.

Provided are combustible compositions. In embodiments, the combustible composition comprises fuel with at least one impurity including vanadium and a water-based fuel additive composition. In embodiments, the combustible composition comprises an ash bearing fuel containing vanadium and a water-based fuel additive composition. In embodiments, the fuel comprises heavy fuel oil or crude oil. In embodiments, the fuel includes one or more impurities selected from vanadium, sodium, and potassium, lead, nickel, or combinations thereof.

In embodiments, vanadium in the fuel containing vanadium can be present in the combustible composition from about 0.5 ppm to 150 ppm, and the water-based fuel additive composition can be present in the combustible composition from about 1 ppm to 50 ppm, per ppm of vanadium present in the fuel. In embodiments, the molar ratio of the first inhibitor to vanadium in the combustible composition is in a range of 0.2 to 10. In embodiments, the molar ratio of the second inhibitor to vanadium in the combustible composition is in a range of 0.2 to 10. In embodiments, the molar ratio of the first inhibitor to vanadium in the combustible composition is in a range of 0.2 to 10 if the first inhibitor is an alkaline-earth element or 0.2 to 4 if the first inhibitor is a rare-earth element. In embodiments, the molar ratio of the second inhibitor to vanadium in the combustible composition is in a range of 0.2 to 10 if the second inhibitor is an alkaline-earth element or 0.2 to 4 if the second inhibitor is a rare-earth element. In embodiments, the molar ratio of the third inhibitor to vanadium in the combustible composition is in a range of 0.2 to 10. The combustible compositions may combusted in a gas turbine or steam boiler.

Provided are methods of operating a combustion apparatus that reduce vanadium corrosion. Also provided are methods for reducing vanadium corrosion when operating a combustion apparatus. In embodiments, the methods include combusting in a combustion apparatus a combustion mixture comprising an ash bearing fuel containing vanadium and a water-based fuel additive composition. In embodiments, the combustion apparatus is a gas turbine, a boiler, or a diesel engine.

In embodiments, the water-based fuel additive composition permits the operation of a gas turbine with an unrefined or poorly-refined fuel, including, but not limited to, heavy fuel oil or crude oil, that would otherwise be impractical as a fuel in a gas turbine. In embodiments, the unrefined or poorly-refined fuel contains up to 25 ppm, up to 50 ppm, up to 100 ppm, up to 150 ppm, up to 200 ppm, or up to 250 ppm, of vanadium compounds.

In embodiments, the combustion step employs a base firing temperature greater than 1950° F., 2000° F., 2050° F., 2100° F., 2150° F., 2200° F., 2250° F., 2300° F., 2350° F., 2400° F., 2450° F., 2500° F., 2550° F., 2600° F., 2650° F., 2700° F., 2750° F., 2800° F., 2850° F., 2900° F., 2950° F., 3000° F., 3050° F., 3100° F., 3150° F., 3200° F., 3250° F., 3300° F., 3350° F., 3400° F., 3450° F., 3500° F., 3550° F., 3600° F., 3650° F., 3700° F., 3750° F., 3800° F., 3850° F., 3900° F., 3950° F., or 4000° F.

In embodiments, a water-based fuel additive composition inhibits corrosion caused by at least one contaminant in the fuel in a hot gas path of a gas turbine. In embodiments, a water-based fuel additive composition inhibits vanadium hot corrosion and corrosion caused by at least one contaminant in the fuel in a hot gas path of a gas turbine. In embodiments, at least one of the first and second inhibitors of a water-based fuel additive composition reacts with vanadium in the fuel during combustion to form at least one inhibitor-vanadium complex having a melting temperature exceeding 4,000° F.

In embodiments, the method includes supplying a fuel including vanadium as a fuel impurity to a gas turbine, supplying a water-based fuel additive composition to the hot gas path, and combusting the fuel in the gas turbine. In embodiments, a water-based fuel additive composition is supplied at a rate sufficient to inhibit vanadium hot corrosion in the gas turbine by converting all or substantially all of the vanadium to an inhibitor-vanadium reaction product. In embodiments, a water-based fuel additive composition is supplied at a rate or amount based on a determined concentration of at least one impurity in the fuel. In embodiments, a water-based fuel additive composition is supplied at a rate or amount to provide a predetermined ratio between at least one component in the water-based fuel additive composition and an impurity quantified in the fuel. In embodiments, the method includes removing an ash product comprising an inhibitor-vanadium reaction product from the gas turbine by washing. In embodiments, a water-based fuel additive composition is supplied to the hot gas path of the gas turbine to inhibit vanadium hot corrosion in the gas turbine from vanadium containing fuel. In embodiments, a water-based fuel additive composition is supplied to the hot gas path either as part of the fuel itself or directly to the hot gas path as a separate feed input. In embodiments, a water-based fuel additive composition is supplied to the hot gas path as part of the fuel itself. In embodiments, a water-based fuel additive composition is supplied directly to the hot gas path as a separate feed input. In embodiments, a water-based fuel additive composition is injected into the hot gas path of the gas turbine. In embodiments, a water-based fuel additive composition is injected into the combustor of the gas turbine. In embodiments, a water-based fuel additive composition is combined with the fuel prior to introduction of the fuel into the combustor.

The invention claimed is:

1. A water-based fuel additive composition for use in a vanadium-containing ash bearing fuel, the composition comprising:
   a first inhibitor and a optional second inhibitor that each retard vanadium corrosion resulting from combustion of the fuel in a combustion apparatus, wherein the first and second inhibitors each, independently, comprise a rare earth element compound, an alkaline earth element compound, or a combination thereof;
   a optional third inhibitor that retards combustion-related contaminant corrosion in the combustion apparatus, wherein the third inhibitor comprises a non-vanadium first row transition metal or main group metal compound;
   a fourth inhibitor that retards non-combustion related corrosion, wherein the fourth inhibitor comprises a fatty amine, an imidazole, a substituted imidazole, or any combination thereof;
   an emulsifier;
   an asphaltene dispersant;
   a optional combustion additive that improves combustion of the fuel, wherein the combustion additive comprises a combustion catalyst selected from a compound of iron, cerium, copper, manganese, magnesium, or any combination thereof; and
   a pH control agent.

2. The composition of claim 1, wherein the emulsifier emulsifies the water-based fuel additive composition with fuel oil.

3. The composition of claim 1, wherein the first inhibitor, the second inhibitor, the third inhibitor, the fourth inhibitor, the emulsifier, the asphaltene dispersant, the combustion additive, and/or the pH control agent are dissolved and dispersed in a water based carrier.

4. The composition of claim 1, wherein the first and second inhibitors are each, independently, a compound of yttrium, lanthanum, cerium, gadolinium, magnesium, calcium, strontium, or any combination thereof.

5. The composition of claim 4, wherein the first and second inhibitors are each, independently, a common aqueous salt selected from a nitrate, a chloride, a sulphate, a nitrite, a hydroxide, an oxide, or any combination thereof.

6. The composition of claim 1, wherein the third inhibitor is a compound of iron, silicon, titanium, nickel, chromium, aluminum, zinc, or any combination thereof.

7. The composition of claim 6, wherein the third inhibitor is a common aqueous salt selected from a nitrate, a chloride, a sulphate, a nitrite, a hydroxide, an oxide, or any combination thereof.

8. The composition of claim 1, wherein the emulsifier is a non-ionic surfactant selected from an alkyl ethoxylate and an alcohol ethoxylate.

9. The composition of claim 1, wherein the asphaltene dispersant is a polymeric resin formulation, wherein the polymeric resin formulation comprises an alkyl phenol formaldehyde or dodecylbenzenesulfonic acid.

10. The composition of claim 1, wherein the pH control agent is a citric acid, an adipic acid, a sebacic acid, an acetic acid, a glycolic acid, a lactic acid, a $C_2$-$C_{12}$ monocarboxylic acid, a $C_2$-$C_{12}$ dicarboxylic acid, a $C_4$-$C_{12}$ tricarboxylic acid, a salt of any foregoing acid, or any combination thereof.

11. The composition of claim 1, wherein the water-based fuel additive composition is 5-35 wt % first inhibitor, 1-35 wt % second inhibitor, 1-20 wt % third inhibitor, 0.1-5 wt % fourth inhibitor, 0.1-5 wt % emulsifier, 0.1-5 wt % asphaltene dispersant, 0.1-5 wt % combustion additive, and an amount of pH control agent that keeps the water-based fuel additive composition pH between a pH of 5.5-7.5.

12. A combustible composition comprising:
an ash bearing fuel comprising vanadium; and
a water-based fuel additive composition, wherein the water-based fuel additive composition comprises:
a first inhibitor and a optional second inhibitor that each retard vanadium corrosion resulting from combustion of the fuel in a combustion apparatus, wherein the first and second inhibitors each, independently, comprise a rare earth element compound, an alkaline earth element compound, or a combination thereof;
a optional third inhibitor that retards combustion-related contaminant corrosion in the combustion apparatus, wherein the third inhibitor comprises a non-vanadium first row transition metal or main group metal compound;
a fourth inhibitor that retards non-combustion related corrosion, wherein the fourth inhibitor comprises a fatty amine, an imidazole, a substituted imidazole, or any combination thereof;
an emulsifier;
an asphaltene dispersant;
a optional combustion additive that improves combustion of the fuel, wherein the combustion additive comprises a combustion catalyst selected from a compound of iron, cerium, copper, manganese, magnesium, or any combination thereof; and
a pH control agent.

13. The composition of claim 12, wherein each of the first, second, and third inhibitors are present in the composition in a range of 0.2 to 10 moles per mole of vanadium present in the composition.

14. A method for reducing vanadium corrosion when operating a combustion apparatus comprising:
combusting in a combustion apparatus a combustion mixture comprising an ash bearing fuel including vanadium and a water-based fuel additive composition, wherein the water-based fuel additive composition comprises:
a first inhibitor and a optional second inhibitor that each retard vanadium corrosion resulting from combustion of the fuel in a combustion apparatus, wherein the first and second inhibitors each, independently, comprise a rare earth element compound, an alkaline earth element compound, or a combination thereof;
a optional third inhibitor that retards combustion-related contaminant corrosion in the combustion apparatus, wherein the third inhibitor comprises a non-vanadium first row transition metal or main group metal compound;
a fourth inhibitor that retards non-combustion related corrosion, wherein the fourth inhibitor comprises a fatty amine, an imidazole, a substituted imidazole, or any combination thereof;
an emulsifier;
an asphaltene dispersant;
a optional combustion additive that improves combustion of the fuel, wherein the combustion additive comprises a combustion catalyst selected from a compound of iron, cerium, copper, manganese, magnesium, or any combination thereof; and
a pH control agent.

15. The method of claim 14, wherein the combustion apparatus is a gas turbine, a boiler, or a diesel engine.

16. The method of claim 14, wherein the combustion step employs a base firing temperature greater than 2,000° F.

17. The method of claim 14, wherein at least one of the first and second inhibitors reacts with vanadium in the fuel during combustion to form at least one inhibitor-vanadium complex having a melting temperature exceeding 4,000° F.

18. The method of claim 14, wherein the third inhibitor retards vanadium corrosion in the combustion apparatus and increases ash deposit friability.

* * * * *